(12) United States Patent
Nishida

(10) Patent No.: US 7,629,775 B2
(45) Date of Patent: Dec. 8, 2009

(54) BATTERY CONNECTION DETECTION CIRCUIT

(75) Inventor: Junji Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 354 days.

(21) Appl. No.: 10/589,682

(22) PCT Filed: Mar. 1, 2005

(86) PCT No.: PCT/JP2005/003827

§ 371 (c)(1), (2), (4) Date: Aug. 16, 2006

(87) PCT Pub. No.: WO2005/083865

PCT Pub. Date: Sep. 9, 2005

(65) Prior Publication Data

US 2008/0224669 A1  Sep. 18, 2008

(30) Foreign Application Priority Data

Mar. 1, 2004  (JP) .................. 2004-056056

(51) Int. Cl.
  *H01J 7/04* (2006.01)
  *H01J 7/16* (2006.01)
  *H01M 6/42* (2006.01)
  *H01J 7/00* (2006.01)
(52) U.S. Cl. ................ 320/165; 320/136
(58) Field of Classification Search .......... 320/165, 320/136; 429/150
See application file for complete search history.

(56) References Cited

U.S. PATENT DOCUMENTS 5,825,155 A * 10/1998 Ito et al. .................. 320/118

FOREIGN PATENT DOCUMENTS

| JP | 5-219655 | 8/1993 |
| JP | 10-225001 | 8/1998 |
| JP | 11-341694 | 12/1999 |
| JP | 2002-10505 | 1/2002 |
| JP | 2003-348763 | 12/2003 |
| KR | 10-0173961 | 5/1999 |

OTHER PUBLICATIONS

Oct. 1, 2007 Korean official action (and English translation thereof) in connection with corresponding Korean application No. 10-2006-7017313.

* cited by examiner

*Primary Examiner*—Edward Tso
*Assistant Examiner*—Yalkew Fantu
(74) *Attorney, Agent, or Firm*—Cooper & Dunham, LLP (57) ABSTRACT

A battery connection detection circuit is disclosed that is able to correctly determine an operation condition of a secondary battery and a connection condition between the secondary battery and a charging device. A determination circuit monitors both the voltage Vt1 on the battery connection terminal T1 and the current supplied to the secondary battery BAT, and therefore, the determination circuit can correctly determine the operation condition of the secondary battery and the connection condition between the secondary battery and the charging device even when high frequency noise is superposed on the power supply voltage Vdd, and when the power supply voltage decreases.

12 Claims, 7 Drawing Sheets

BATTERY CONNECTION DETECTION CIRCUIT

TECHNICAL FIELD

The present invention relates to a battery connection detection circuit of a charging device for charging a secondary battery in connection, and particularly, to a battery connection detection circuit for detecting whether the secondary battery is in reliable connection with the charging device, whether the secondary battery in connection with the charging device has a low internal impedance, and whether the secondary battery is in good condition and is able to be charged.

BACKGROUND ART

In order to detect connection conditions of a secondary battery connected to a charging device, such as a lithium-ion battery, usually a thermistor installed in the secondary battery can be used to detect the temperature of the secondary battery being charged, or a built-in resistor can be used to detect the connection conditions of the secondary battery. Specifically, a current is directed to flow through the thermistor or the resistor, and a voltage occurring between two ends of them is measured to detect the battery connection conditions. Alternatively, as a well known method, a current is directed to flow through the secondary battery connected to the charging device, and a voltage between two battery connection terminals of the charging device can be measured to determine whether the battery is reliably connected.

In the former method, when the secondary battery is connected to the charging device, even if the terminals of the thermistor or the resistor and the charging device are reliably connected, it cannot be guaranteed that the electrode of the secondary battery and the charging device are reliably connected. In other words, even when the charging device charges the secondary battery assuming the secondary battery is reliably connected, sometimes, because the battery connection terminal actually is not in contact with the electrode of the battery, the secondary battery is actually not charged. Similarly, even when the electrode of the battery is connected to the charging device, if the thermistor or the resistor is not in good connection condition, temperature control cannot be carried out appropriately in the course of charging, insufficient charging happens, and the secondary battery may experience problems.

Figure 7:
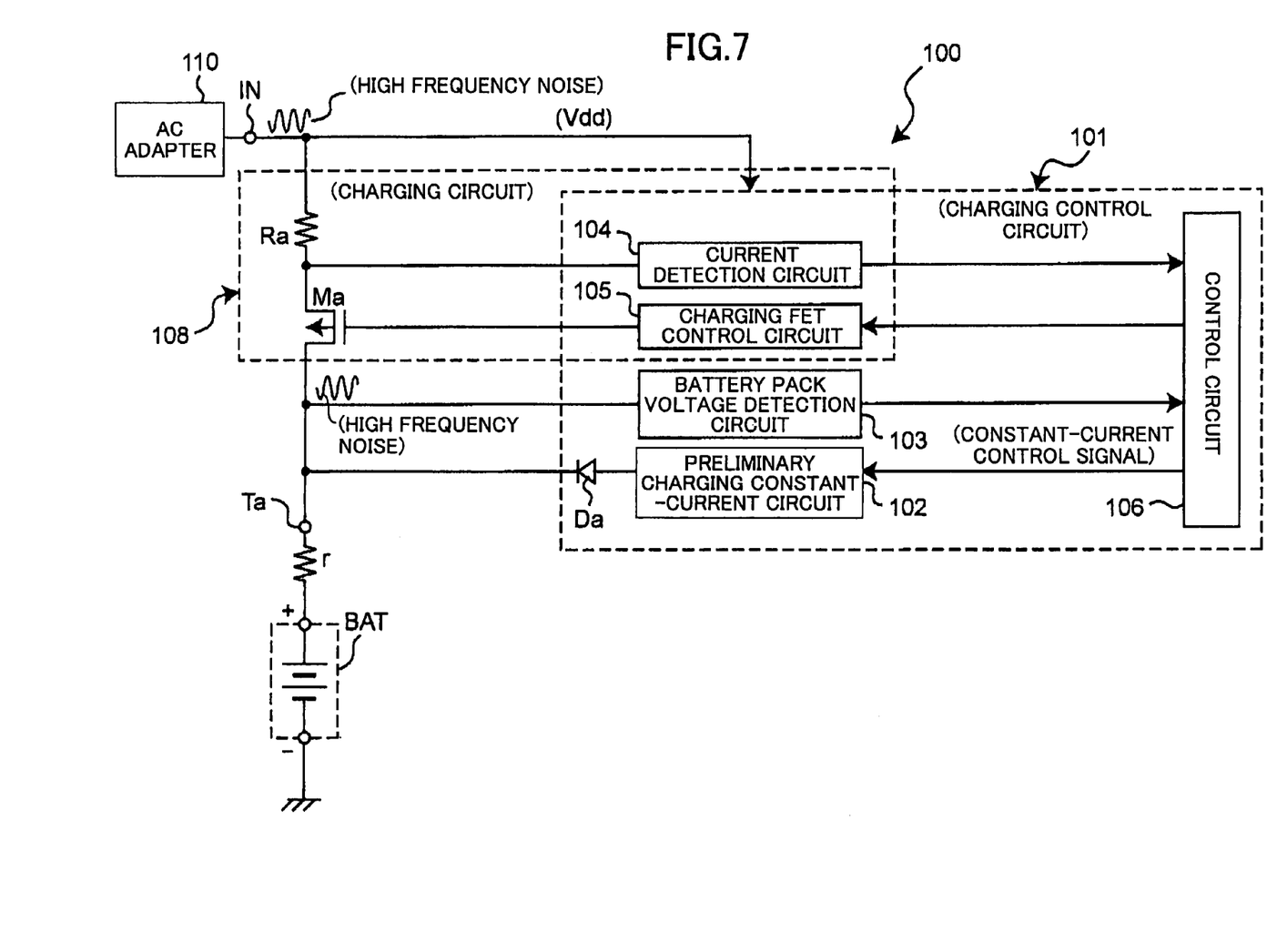
FIG. 7 is a block diagram showing an internal configuration of a charging device of the related art.

FIG. 7 is a block diagram showing an internal configuration of a charging device 100 of the related art, presenting a method of confirming the voltage on a secondary battery BAT mounted on the charging device 100.

As illustrated in FIG. 7, a charging control circuit 101, which functions as a detection circuit for detecting whether the secondary battery BAT is reliably connected, includes a preliminary charging constant-current circuit 102 for supplying a predetermined current to the secondary battery BAT, a diode Da for preventing a reverse current, a battery pack voltage detection circuit 103 for detecting the voltage on a battery connection terminal Ta of the charging device 100, a current detection circuit 104, and a charging FET control circuit 105. A resistance component r corresponds to the sum of the internal resistance of the secondary battery BAT and the contact resistance between an electrode of the secondary battery BAT and the battery connection terminal Ta of the charging device 100.

When the secondary battery BAT is reliably connected, the impedance of the resistance component r is small, and it is thought that the change of the voltage caused by the resistance component r is negligible, hence, the voltage on a battery connection terminal Ta equals the voltage on the secondary battery BAT. However, the impedance of the resistance component r increases if the secondary battery BAT is not appropriately connected, or even though the secondary battery BAT is appropriately connected, the electrode of the secondary battery BAT and the battery connection terminal Ta of the charging device 100 are not in good connection conditions, resulting in a large contact resistance between them, or the secondary battery BAT is not in good connection conditions, and has a large internal resistance.

In these cases, even when a small current is supplied to the secondary battery BAT, the voltage on the battery connection terminal Ta of the charging device 100 increases up to the voltage on an input terminal (IN) connected to an AC adapter. From these facts, the battery pack voltage detection circuit 103 detects that the voltage on the secondary battery BAT reaches an un-specified value, and with the detection results, it is possible to reliably connect the battery.

For example, Japanese Laid Open Patent Application No. 5-219656 discloses a battery charger which has a charging mode and an adapter mode, and when bad connection conditions or other anomalies are detected, the battery charger shows an alarm and stop output.

The charging device of the related art, however, is supplied with a DC current from an AC adapter, which works as a power supply. Due to this, high frequency noise superposed on the AC line is also superposed on the power supply voltage Vdd. Namely, the high frequency noise also influences the battery connection terminal Ta, and sometimes, the high frequency noise may also be superposed on the voltage on the battery connection terminal Ta. When the voltage superposed with the high frequency noise reaches an un-specified value for the secondary battery BAT, a determination is made that bad connection conditions occur. In addition, when the voltage of the AC line decreases depending on the load of the charging device 100, the voltage on the battery connection terminal Ta does not reach a battery pack unspecified value inside the charging device, and this cannot be determined as bad connection conditions.

SUMMARY

In an aspect of this disclosure, there is provide a battery connection detection circuit that is able to correctly determine an operation condition of a secondary battery and a connection condition between the secondary battery and a charging device even when high frequency noise is superposed on a power supply of the charging device, and even when an output voltage of the power supply decreases.

In another aspect of this disclosure, there is provided a battery connection detection circuit for detecting whether a secondary battery is operable and whether the secondary battery is reliably connected to a charging device, comprising: a current supplying circuit configured to supply a current to the secondary battery; a constant voltage circuit configured to control the current from the current supplying circuit so that a voltage on a connection terminal T1 for connecting the secondary battery is constant; a constant current circuit configured to control the current from the current supplying circuit so that the current supplied to the secondary battery is constant; and a determination circuit configured to determine operation states of the constant voltage circuit and the constant current circuit, said determination circuit determining whether the secondary battery is operable and whether the secondary battery is reliably connected to the charging device according to the operation states of the constant voltage circuit and the constant current circuit.

In an embodiment, the determination circuit determines an operation state of a load circuit that receives power supply from the secondary battery; and when it is detected that the load circuit does not consume a current, the determination circuit determines whether the secondary battery is operable and whether the secondary battery is reliably connected to the charging device according to the operation states of the constant voltage circuit and the constant current circuit.

In an embodiment, when it is determined that the voltage on the connection terminal T1 is lower than a predetermined value from the operation state of the constant current circuit, or the current flowing through the secondary battery is higher than a predetermined value from the operation state of the constant current circuit, the determination circuit determines the secondary battery is operable and the secondary battery is reliably connected to the connection terminal T1.

In an embodiment, the current supplying circuit includes a current control transistor that controls the current supplied to the secondary battery according to a control signal input to a control electrode thereof; the constant voltage circuit includes a voltage detection circuit that detects the voltage on the connection terminal T1 and outputs a voltage Vd1 proportional to the detected voltage, a first calculation. amplification circuit into which the output voltage Vd1 from the voltage detection circuit and a first reference voltage Vs1 are input, and a first control transistor whose operation is controlled according to an output signal CV from the first calculation amplification circuit; the constant current circuit includes a current detection circuit that converts the current supplied by the current supplying circuit into a voltage and outputs the voltage, a second calculation amplification circuit into which the output voltage from the current detection circuit and a second reference voltage Vs2 are input, and a second control transistor whose operation is controlled according to an output signal CC from the second calculation amplification circuit; and the current control transistor controls the current supplied to the secondary battery according to operations of the first control transistor and the second control transistor.

Alternatively, as an embodiment, the current supplying circuit includes a current control transistor that controls the current supplied to the secondary battery according to a control signal input to a control electrode thereof; the constant voltage circuit includes a voltage detection circuit that detects the voltage on the connection terminal T1 and outputs a voltage Vd1 proportional to the detected voltage, a switching circuit that exclusively selects one of a plurality of input reference voltages Vr1 to Vrn according to an input control signal Sc1, and outputs the selected reference voltage as a first reference voltage Vs1, a first calculation amplification circuit into which the output voltage Vd1 from the voltage detection circuit and the first reference voltage Vs1 are input, and a first control transistor whose operation is controlled according to an output signal CV from the first calculation amplification circuit; the constant current circuit includes a current detection circuit that converts the current supplied by the current supplying circuit into a voltage and outputs the voltage, a second calculation amplification circuit into which the output voltage from the current detection circuit and a second predetermined reference voltage Vs2 are input, and a second control transistor whose operation is controlled according to an output signal CC from the second calculation amplification circuit; and the current control transistor controls the current supplied to the secondary battery according to operations of the first control transistor and the second control transistor.

In an embodiment, the operation state of the constant voltage circuit corresponds to a state of the output signal CV from the first calculation amplification circuit; and the operation state of the constant current circuit corresponds to a state of the output signal CC from the second calculation amplification circuit.

In an embodiment, the current control transistor includes a MOS transistor, or a bipolar transistor.

In an embodiment, the determination circuit determines the secondary battery is operable and the secondary battery is reliably connected to the connection terminal T1, when the output signal CV from the first calculation amplification circuit indicates that the output voltage Vd1 from the voltage detection circuit is lower than the first reference voltage Vs1, or when the output signal CC from the second calculation amplification circuit indicates that the output voltage from the current detection circuit is higher than or equal to the second reference voltage Vs2.

In an embodiment, the current supplying circuit, the constant voltage circuit, the constant current circuit, and the determination circuit are integrated in one Integrated Circuit (IC).

In an embodiment, the current supplying circuit, the constant voltage circuit, the constant current circuit, the determination circuit, and the load circuit are integrated in one Integrated Circuit (IC).

According to the battery connection detection circuit of the present invention, two factors, namely, the voltage on the connection terminal T1 and the current flowing through the secondary battery are used in order to determine whether the secondary battery is operable and whether the secondary battery is reliably connected to the connection terminal T1. In doing so, it is possible to correctly determine the operation condition of the secondary battery and the connection condition between the secondary battery and the charging device even when high frequency noise is superposed on the power supply of the charging device, and even when the output voltage of the power supply decreases.

In addition, because when the load circuit does not consume a current, the determination circuit determines whether the secondary battery is operable and whether the secondary battery is reliably connected to the charging device, it is possible to further improve reliability of the determination.

Further, because a bipolar transistor is used in the current control transistor in the current supplying circuit which supplies a current to the secondary battery, the high frequency noise superposed on the power supply voltage can hardly be transmitted to the connection terminal T1, hence, it is possible to further improve reliability of the determination.

These and other objects, features, and advantages of the present invention will become more apparent from the following detailed description of preferred embodiments given with reference to the accompanying drawings.

BEST MODE FOR CARRYING OUT THE INVENTION

Below, preferred embodiments of the present invention are explained with reference to the accompanying drawings.

FIRST EMBODIMENT

Figure 1:
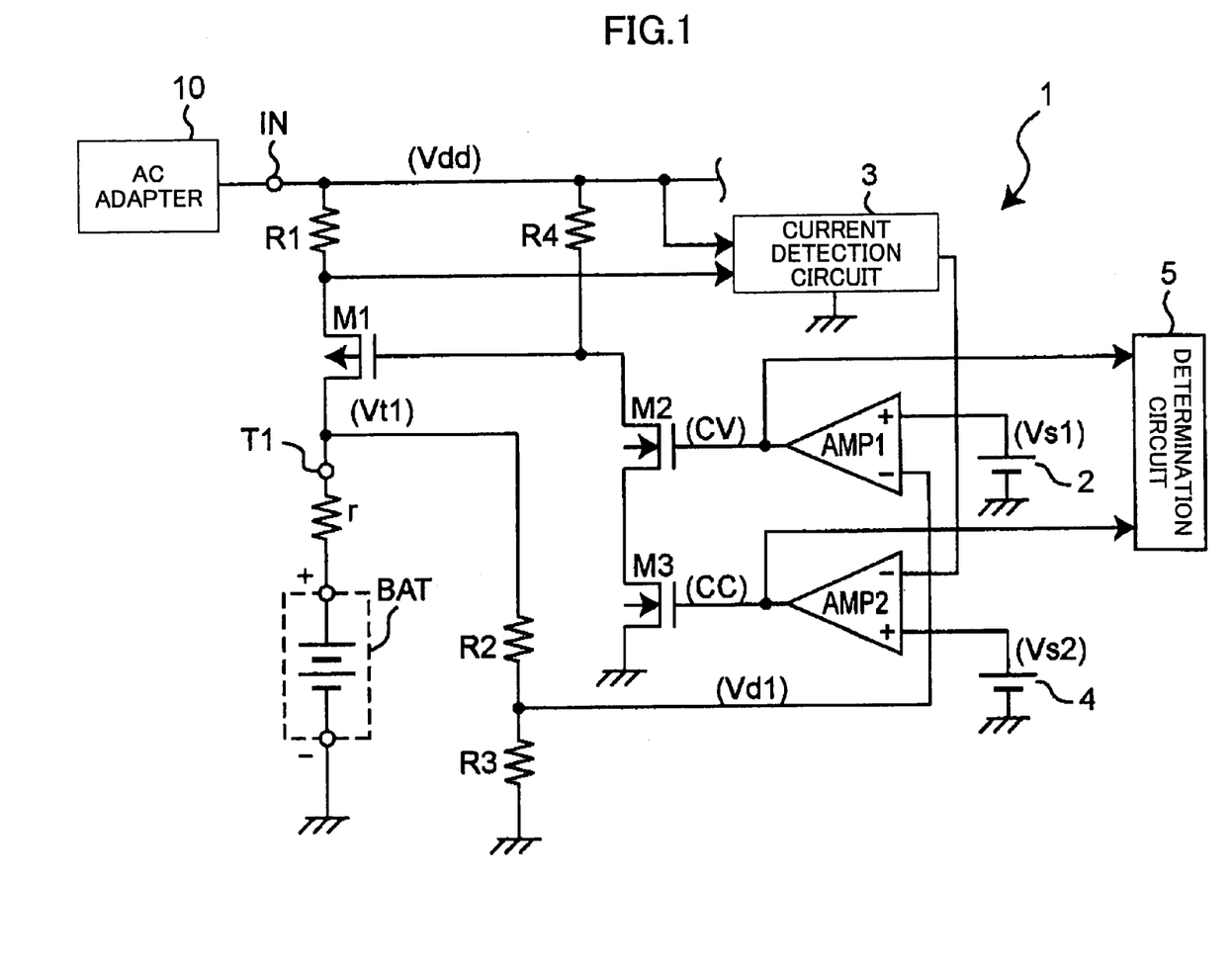
FIG. 1 is a circuit diagram showing an example of a configuration of a battery connection detection circuit according to a first embodiment of the present invention.

FIG. 1 is a circuit diagram showing an example of a configuration of a battery connection detection circuit 1 according to a first embodiment of the present invention.

The battery connection detection circuit 1 shown in FIG. 1 is installed in a charging device for a secondary battery.

As illustrated in FIG. 1, the battery connection detection circuit 1 includes a PMOS transistor M1 for supplying a current to a secondary battery BAT, a constant resistance R1 for detecting the current flowing through the PMOS transistor M1, constant resistances R2 and R3 for detecting the voltage Vt1 on a battery connection terminal T1 of the charging device, a resistance R4 functioning as a pull-up resistance, a first reference voltage generation circuit 2 that generates and outputs a first reference voltage Vs1, a first calculation amplification circuit AMP1, a second calculation amplification circuit AMP2, and NMOS transistors M2, M3.

The battery connection detection circuit 1 includes a current detection circuit 3 that converts a voltage drop on the resistance R1 to a voltage relative to a grounding voltage reference, and outputs the voltage, a second reference voltage generation circuit 4 that generates and outputs a second reference voltage Vs2, and a determination circuit 5 that determines whether the secondary battery BAT is operable and whether the secondary battery BAT is reliably connected to the charging device.

Here, the PMOS transistor M1 and the resistance R4 constitute the current supplying circuit in the claims, the first calculation amplification circuit AMP1, the first reference voltage generation circuit 2, the NMOS transistor M2, and resistances R2 and R3 constitute the constant voltage circuit in the claims. In addition, the PMOS transistor M1 corresponds to the current control transistor, and the resistances R2 and R3 correspond to the voltage detection circuit in the claims. Further, the current detection circuit 3, the second calculation amplification circuit AMP2, the NMOS transistor M3, and the resistance R1 constitute the constant current circuit in the claims, the NMOS transistor M2 corresponds to the first control transistor in the claims, and the NMOS transistor M3 corresponds to the second control transistor in the claims.

In FIG. 1, a power supply voltage Vdd is input from an AC adapter 10 to an input terminal IN. The PMOS transistor M1 is connected in series between the input terminal IN and the battery connection terminal T1, and a resistance component r and the secondary BAT are connected in series between the battery connection terminal T1 and the ground. The resistance component r corresponds to the sum of the internal resistance of the secondary battery BAT and the contact resistance between an electrode of the secondary battery BAT and the battery connection terminal T1. The NMOS transistors M2, M3 are connected in series between the gate of the PMOS transistor M1 and the ground, and the resistance R4 is connected between the input terminal IN and the gate of the PMOS transistor M1.

The gate of the NMOS transistor M2 is connected to an output terminal of the first calculation amplification circuit AMP1, and the first reference voltage Vs1 is input to a non-inverted input terminal of the first calculation amplification circuit AMP1. The resistances R2, R3 are connected in series between the battery connection terminal T1 and the ground, and the connecting point of the resistances R2, R3 is connected to the non-inverted input terminal of the first calculation amplification circuit AMP1.

In addition, the current detection circuit 3 is driven by the power supply voltage Vdd and the ground voltage, converts the voltage at the connecting point between the resistance R1 and the PMOS transistor M1 to a voltage relative to the grounding voltage, and outputs the voltage to an inverted input terminal of the second calculation amplification circuit AMP2. The output signal CV from the first calculation amplification circuit AMP1 and the output signal CC from the second calculation amplification circuit AMP2 are transmitted to the determination circuit 5.

Figure 2:
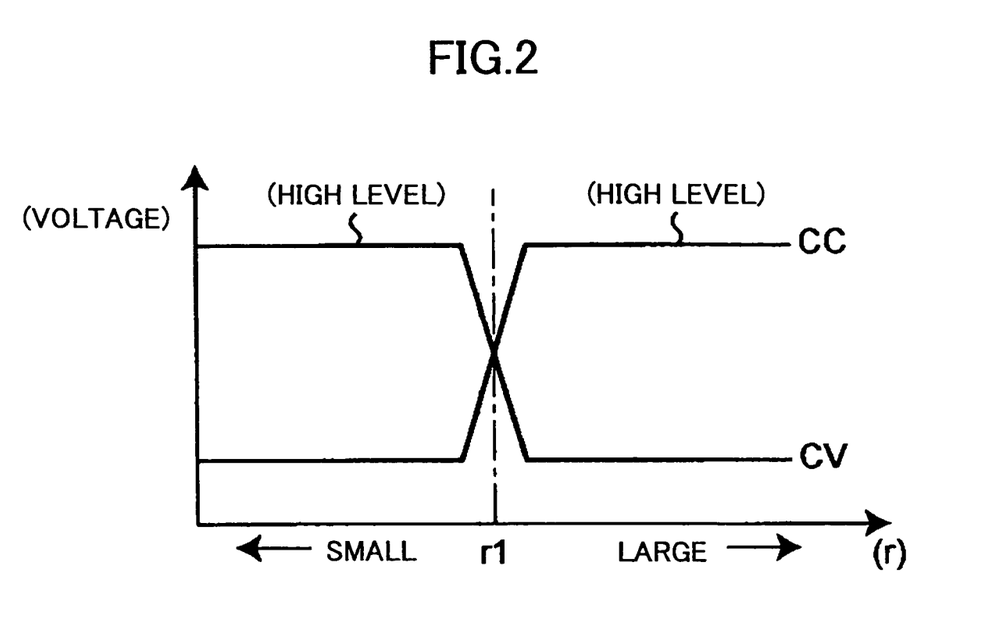
FIG. 2 shows dependence of the output signal CV from the first calculation amplification circuit AMP1 and the output signal CC from the second calculation amplification circuit AMP2 on the impedance of the resistance component r.

FIG. 2 shows dependence of the output signal CV from the first calculation amplification circuit AMP1 and the output signal CC from the second calculation amplification circuit AMP2 on the impedance of the resistance component r. Below, operations of the battery connection detection circuit 1 with the above configuration are exemplified with reference to FIG. 2.

Below, it is assumed that an operable secondary battery BAT, which has small internal resistance, is installed in the charging device, and the contact resistance between the electrode of the secondary battery BAT and the battery connection terminal T1 is small, that is, the impedance of the resistance component r is small.

Under these conditions, even when a current is supplied to the secondary battery BAT through the PMOS transistor M1, the voltage Vt1 on the battery connection terminal T1 is small, and the voltage input to the inverted input terminal of the first calculation amplification circuit AMP1 is lower than the first reference voltage Vs1. Due to this, the output signal CV from the first calculation amplification circuit AMP1 is at a high level, and the NMOS transistor M2 is switched on.

The current flowing through the PMOS transistor M1 is converted to a voltage at the resistance R1, and this voltage is converted to a voltage relative to the grounding voltage by the current detection circuit 3, and is input to the inverted input terminal of the second calculation amplification circuit AMP2.

The second reference voltage Vs2 is input to a non-inverted input terminal of the second calculation amplification circuit AMP2, and the output signal CC from the second calculation amplification circuit AMP2 controls operations of the NMOS transistor M3 so that the output voltage of the current detection circuit 3 is equal to the second reference voltage Vs2. As a result, the current flowing through the PMOS transistor M1 is controlled to be a constant current. In other words, as illustrated in FIG. 2, when the impedance of the resistance component r is small, the output signal CV from the first calculation amplification circuit AMP1 is at the high level, and the output signal CC from the second calculation amplification circuit AMP2 is at a low level near the threshold voltage of the NMOS transistor M3.

Next, it is assumed that a defective secondary battery BAT, which has large internal resistance, is installed in the charging device, and the contact resistance between the electrode of the secondary battery BAT and the battery connection terminal T1 is large, that is, the impedance of the resistance component r is small.

Under these conditions, even when a small current is supplied to the secondary battery BAT through the PMOS transistor M1, the voltage Vt1 on the battery connection terminal T1 is large. When the voltage Vt1 on the battery connection terminal T1 reaches the first reference voltage Vs1, the level of the output signal CV from the first calculation amplification circuit AMP1 decreases, and the voltage Vt1 on the battery connection terminal T1 is controlled so that the voltage Vd1 at the connecting point between the resistances R2, R3 becomes equal to the first reference voltage Vs1.

As a result, the current flowing through the PMOS transistor M1 decreases compared to the case when the impedance of the resistance component r is small, the output voltage of the current detection circuit 3 is lower than the second reference voltage Vs2, and the output signal CC from the second calculation amplification circuit AMP2 is at the high level.

In other words, as illustrated in FIG. 2, when the impedance of the resistance component r is large, the output signal CC from the second calculation amplification circuit AMP2 is at the high level, and the output signal CV from the first calculation amplification circuit AMP1 is at a low level near the threshold voltage of the NMOS transistor M2.

If the limit of the impedance of the resistance component r is set to be a normalized value r1 as indicated in FIG. 2, it is clear that the condition for the secondary battery BAT to have small internal resistance, and the electrode of the secondary battery BAT to be reliably connected to the battery connection terminal T1 is that the impedance is on the left side of the normalized value r1, that is, the impedance is less than the normalized value r1.

In other words, a determination condition may be set such that the determination circuit 5 determines the battery connection condition is good, when the output signal CV from the first calculation amplification circuit AMP1 is at the high level, or when the output signal CC from the second calculation amplification circuit AMP2 is at the high level, or when both the output signal CV from the first calculation amplification circuit AMP1 and the output signal CC from the second calculation amplification circuit AMP2 are at the high level.

In this way, not only the voltage Vt1 on the battery connection terminal T1, but also the current supplied to the secondary battery BAT are monitored, thereby, it is possible to perform battery connection detection without influence from the power supply voltage Vdd.

For example, the first reference voltage generation circuit 2, the current detection circuit 3, the second reference voltage generation circuit 4, the determination circuit 5, the first calculation amplification circuit AMP1, the second calculation amplification circuit AMP2, the PMOS transistor M1, the NMOS transistors M2, M3, and the resistances R1 to R4 can be integrated into one Integrated Circuit (IC).

In addition, instead of the PMOS transistor M1 in FIG. 1, a bipolar transistor may be used.

Figure 3:
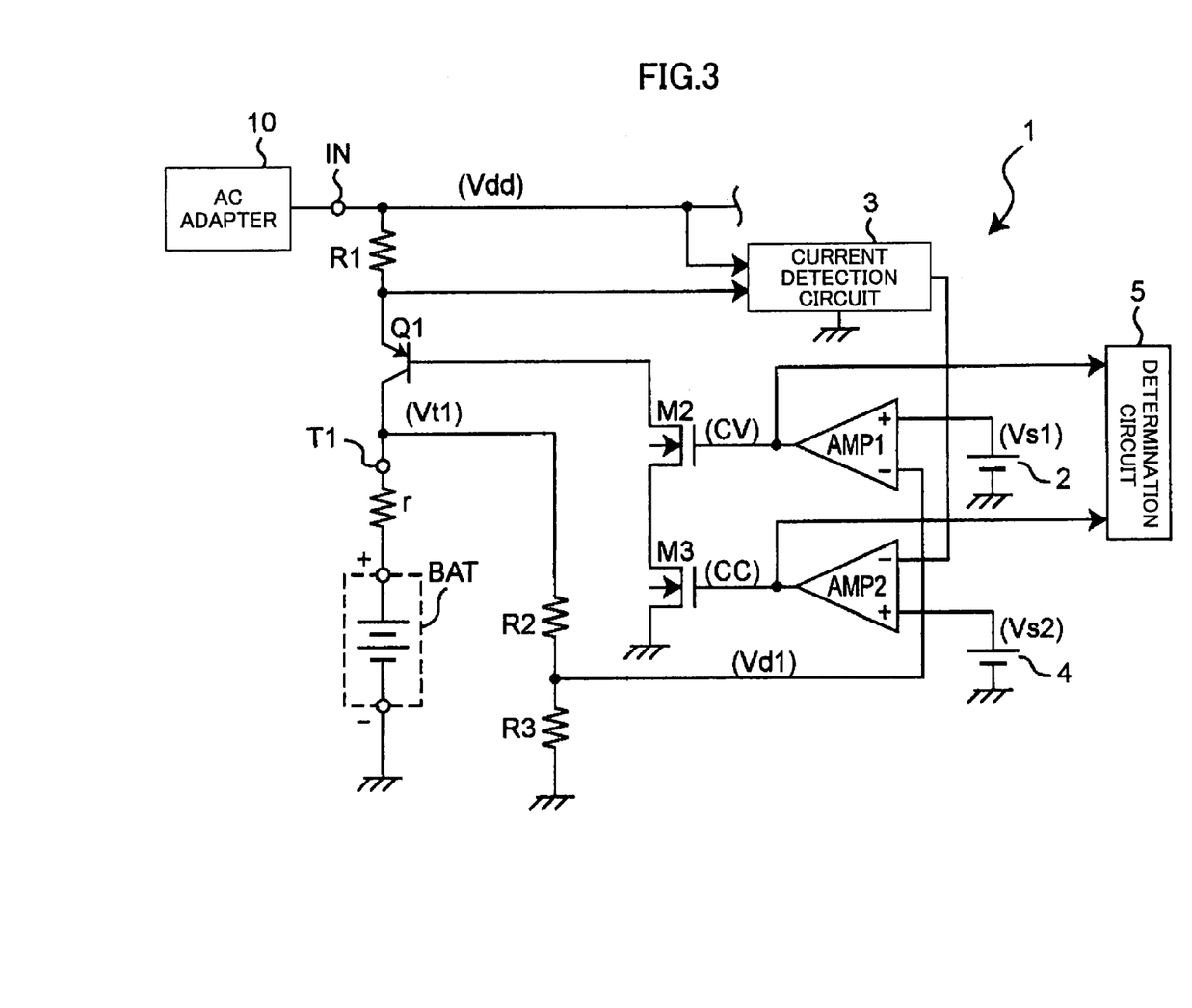
FIG. 3 is a circuit diagram showing another example of a configuration of the battery connection detection circuit according to the first embodiment of the present invention.

FIG. 3 is a circuit diagram showing another example of a configuration of the battery connection detection circuit 1 according to the first embodiment of the present invention.

When a bipolar transistor is used instead of the PMOS transistor M1, the battery connection detection circuit 1 has a circuit configuration as shown in FIG. 3. In FIG. 3, a pnp transistor Q1 functions as the current supplying circuit and as the current control transistor in the claims.

Figure 4:
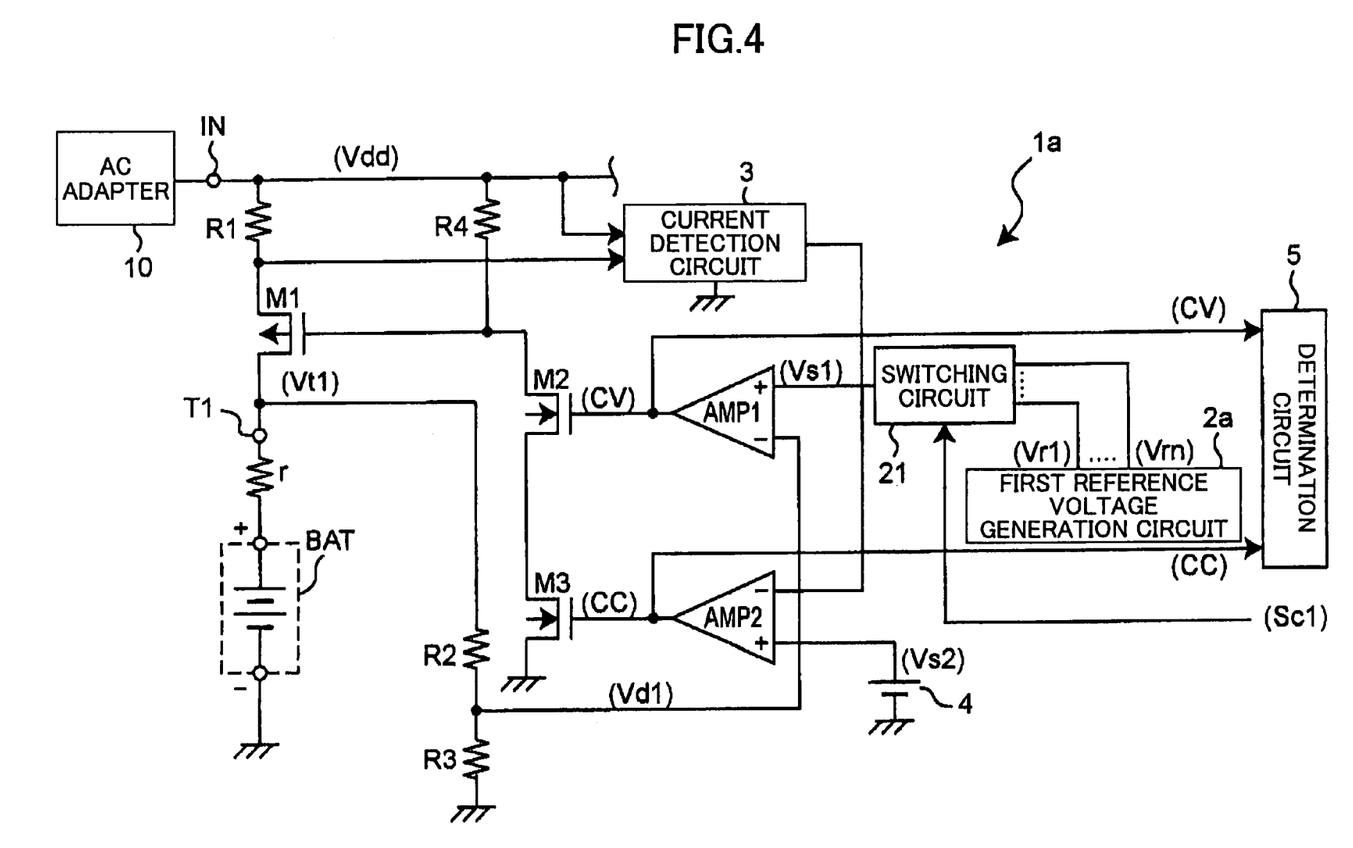
FIG. 4 is a circuit diagram showing an example of a configuration of a battery connection detection circuit according to a second embodiment of the present invention.

By replacing the PMOS transistor M1 with the pnp transistor Q1, the resistance R4 in FIG. 4 can be omitted, and the impedance of the drain of the NMOS transistor M2 is lowered, and the high frequency noise superposed on the power supply voltage Vdd can hardly be transmitted to the connection terminal T1, and hence, it is possible to further improve reliability of battery connection detection.

Similarly, in this example, the first reference voltage generation circuit 2, the current detection circuit 3, the second reference voltage generation circuit 4, the determination circuit 5, the first calculation amplification circuit AMP1, the second calculation amplification circuit AMP2, the pnp transistor Q1, the NMOS transistors M2, M3, and the resistances R1 to R3 can be integrated into one Integrated Circuit (IC).

According to the present embodiment, because both the voltage Vt1 on the battery connection terminal T1 and the current supplied to the secondary battery BAT are monitored, it is possible to correctly determine the operation condition of the secondary battery BAT and the connection condition between the secondary battery BAT and the charging device even when high frequency noise is superposed on the power supply voltage Vdd, and when the power supply voltage decreases.

SECOND EMBODIMENT

FIG. 4 is a circuit diagram showing an example of a configuration of a battery connection detection circuit 1a according to a second embodiment of the present invention.

In the previous embodiment, the first reference voltage Vs1 input to the non-inverted input terminal of the first calculation amplification circuit AMP1 is one voltage signal.

Meanwhile, in the present embodiment, one of plural reference voltage signals Vr1 to Vrn is selected and used as the first reference voltage Vs1.

In FIG. 4, the same reference numbers are used for the same elements as those in the previous embodiment, and only differences with the first embodiment are described in detail with overlapping descriptions being omitted.

The battery connection detection circuit 1a in FIG. 4 differs from the battery connection detection circuit 1 in FIG. 1 in that the first reference voltage generation circuit generates plural reference voltages Vr1 to Vrn (n is an integer greater than 1), and a switching circuit 21 is provided to exclusively select one of the reference voltages Vr1 to Vrn according to an input control signal Sc1, and outputs the selected reference voltage to the non-inverted input terminal of the first calculation amplification circuit AMP1 as the first reference voltage Vs1. Accordingly, the battery connection detection circuit 1 and the first reference voltage generation circuit 2 in FIG. 1 are indicated as the battery connection detection circuit 1a and the first reference voltage generation circuit 2a, respectively.

In FIG. 4, the battery connection detection circuit 1a includes a PMOS transistor M1, resistances R1 to R4, the first reference voltage generation circuit 2a that generates and outputs reference voltages Vr1 to Vrn, and the switching circuit 21. Further, the battery connection detection circuit 1a includes the first calculation amplification circuit AMP1, the second calculation amplification circuit AMP2, the NMOS transistors M2, M3, the current detection circuit 3, the second reference voltage generation circuit 4, and the determination circuit 5.

Here, the first calculation amplification circuit AMP1, the first reference voltage generation circuit 2a, the switching circuit 21, the NMOS transistor M2, and resistances R2 and R3 constitute the constant voltage circuit in the claims.

The reference voltages Vr1 to Vrn from the first reference voltage generation circuit 2a are input to the switching circuit 21, and an external control signal Sc1 is input to the switching circuit 21.

According to the control signal Sc1, the switching circuit 21 exclusively selects one of the reference voltages Vr1 to Vrn, and outputs the selected reference voltage to the non-inverted input terminal of the first calculation amplification circuit AMP1 as the first reference voltage Vs1.

For example, if n=2, from the signal CV with the reference voltage Vr1 as the first reference voltage Vs1, and the signal CV with the reference voltage Vr2 as the first reference voltage Vs1, the determination circuit 5 can determine whether the secondary battery BAT is reliably connected to the connection terminal T1.

Further, if n>2, from the signals CV respectively corresponding to the reference voltages Vr1 to Vrn, the determination circuit 5 can determine the value range of the resistance component r, and control charging of the secondary battery BAT according to the resistance component r.

Similarly, the first reference voltage generation circuit 2a, the current detection circuit 3, the second reference voltage generation circuit 4, the determination circuit 5, the switching circuit 21, the first calculation amplification circuit AMP1, the second calculation amplification circuit AMP2, the PMOS transistor M1, the NMOS transistors M2, M3, and the resistances R1 to R4 can be integrated into one Integrated Circuit (IC).

According to the present embodiment, the same effects as the first embodiment are obtainable. In addition, by changing the first reference voltage Vs1, it is possible to determine the impedance of the resistance component r, thereby further improving reliability when determining the connection condition of the secondary battery BAT. In addition, because the range of the impedance of the resistance component r can be determined, it is possible to control charging of the secondary battery BAT according to the resistance component r.

THIRD EMBODIMENT

Figure 5:
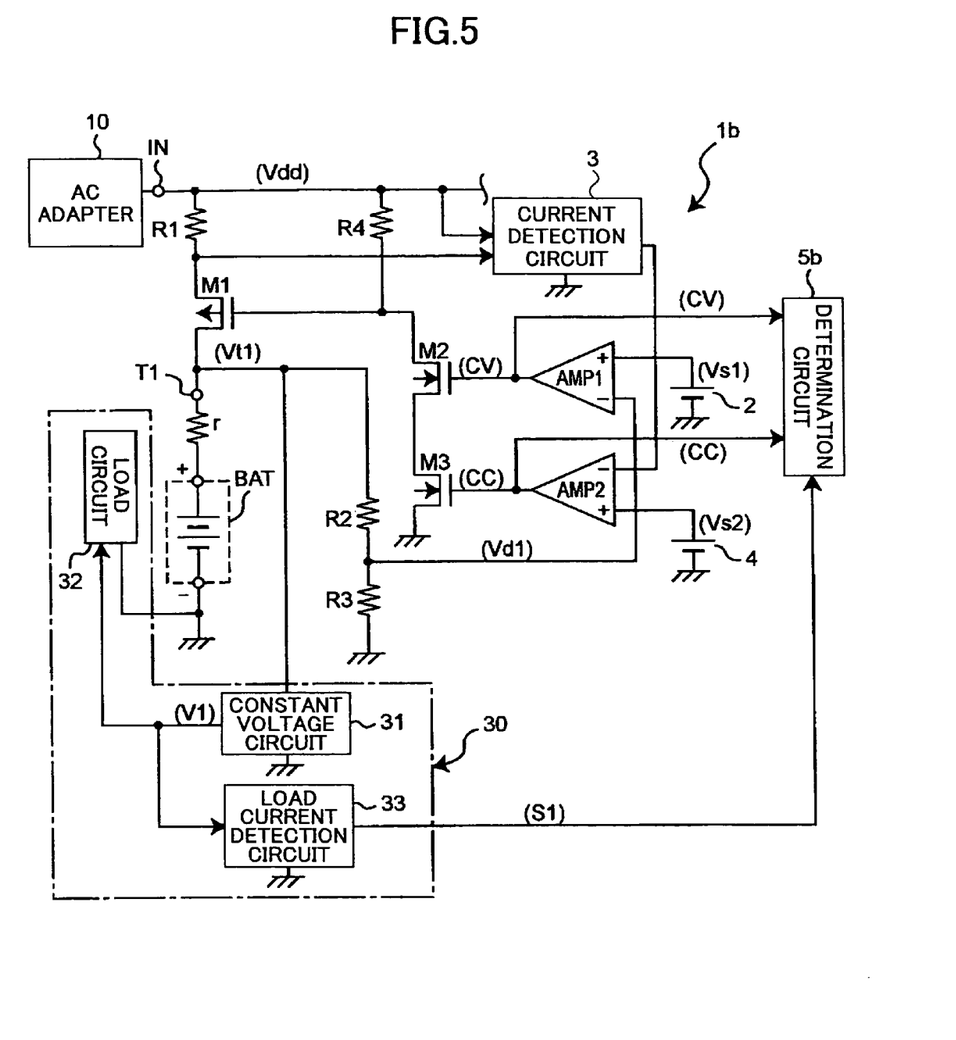
FIG. 5 is a circuit diagram showing an example of a configuration of a battery connection detection circuit according to a third embodiment of the present invention.

FIG. 5 is a circuit diagram showing an example of a configuration of a battery connection detection circuit 1b according to a third embodiment of the present invention.

In the present embodiment, a load circuit is connected to the secondary battery BAT, and it is configured so that the connection condition of the secondary battery BAT is detected when the load circuit does not produce current consumption.

In FIG. 5, the same reference numbers are used for the same elements as those in the previous embodiments, and only differences with the previous embodiments are described in detail with overlapping descriptions being omitted.

The battery connection detection circuit 1b in FIG. 5 differs from the battery connection detection circuit 1 in FIG. 1 in that an external load circuit 30 is provided, which includes a constant voltage circuit 31, a load circuit 32, and a load current detection circuit 33.

The constant voltage circuit 31, with the voltage Vt1 on the battery connection terminal T1 as a power supply, generates a constant voltage V1. The load circuit 32 is driven to operate by the constant voltage V1. The load current detection circuit 33 detects the current through the load circuit 32.

The load current detection circuit 33 outputs a state signal S1 to the determination circuit 5, which indicates current consumption state of the load circuit 32, and the determination circuit 5 detects the connection condition of the secondary battery BAT when the load circuit 32 does not produce current consumption.

In FIG. 5, the battery connection detection circuit 1 and the determination circuit 5 in FIG. 1 are indicated as the battery connection detection circuit 1b and the determination circuit 5b, respectively.

In FIG. 5, the constant voltage circuit 31 is driven by the voltage Vt1 at the battery connection terminal T1 to generate the constant voltage V1, and outputs the constant voltage V1 to the load circuit 32. The load circuit 32 is driven to operate by the constant voltage V1. The load current detection circuit 33 detects the current supplied from the constant voltage circuit 31 to the load circuit 32, and outputs a state signal S1 to the determination circuit 5 when the load circuit 32 does not produce current consumption. In this situation, the current consumption of the constant voltage circuit 31 is very small and is negligible.

When the state signal S1 is input to the determination circuit 5b from the load current detection circuit 33, as described in the first embodiment, the determination circuit 5b starts operations of detecting the connection condition of the secondary battery BAT based on the output signal CV from the first calculation amplification circuit AMP1 and the output signal CC from the second calculation amplification circuit AMP2. If the state signal S1 is not input, the determination circuit 5b stops detection of connection condition of the secondary battery BAT.

For example, the first reference voltage generation circuit 2, the current detection circuit 3, the second reference voltage generation circuit 4, the determination circuit 5b, the first calculation amplification circuit AMP1, the second calculation amplification circuit AMP2, the PMOS transistor M1, the NMOS transistors M2, M3, and the resistances R1 to R4 can be integrated into one Integrated Circuit (IC). Furthermore, the external load circuit 30 may also be integrated into the IC.

Figure 6:
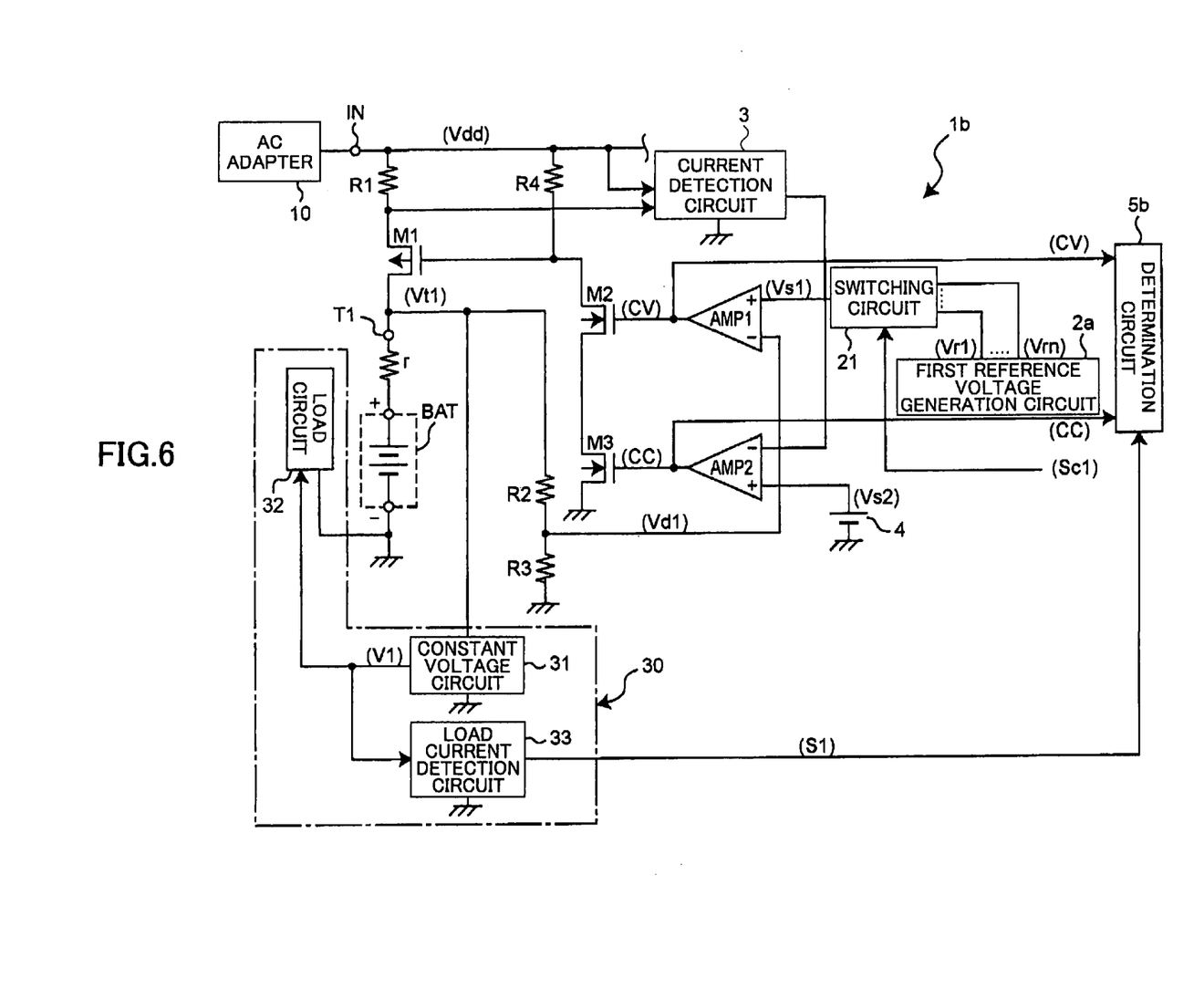
FIG. 6 is a circuit diagram showing another example of the battery connection detection circuit according to the third embodiment of the present invention.

FIG. 6 is a circuit diagram showing another example of the battery connection detection circuit 1b according to the third embodiment of the present invention, having a configuration in correspondence to the battery connection detection circuit in FIG. 4. In FIG. 6, the same reference numbers are used for the same elements as those in the previous embodiments, and overlapping descriptions are omitted.

When the state signal S1 is input to the determination circuit 5b from the load current detection circuit 33, as described in the second embodiment, the determination circuit 5b starts operations of detecting the connection condition of the secondary battery BAT based on the output signal CV from the first calculation amplification circuit AMP1 and the output signal CC from the second calculation amplification circuit AMP2. If the state signal S1 is not input to the determination circuit 5b, the determination circuit 5b stops detection of connection condition of the secondary battery BAT.

For example, the first reference voltage generation circuit 2a, the current detection circuit 3, the second reference voltage generation circuit 4, the determination circuit 5b, the switching circuit 21, the first calculation amplification circuit AMP1, the second calculation amplification circuit AMP2, the PMOS transistor M1, the NMOS transistors M2, M3, and the resistances R1 to R4 can be integrated into one Integrated Circuit (IC). Furthermore, the external load circuit 30 may also be integrated into the IC.

When the load circuit 32 does not produce current consumption, the impedance at the battery connection terminal T1 substantially corresponds only to the impedance of the resistance component r. Due to this, in the present embodiment, it is configured so that the determination circuit 5b starts operations of detecting the connection condition of the secondary battery BAT when the load circuit 32 does not produce current consumption.

As a result, the same effects as those of the first embodiment are obtainable. In addition, it is possible to more accurately perform connection condition detection of the secondary battery BAT.

While the present invention is above described with reference to specific embodiments chosen for purpose of illustration, it should be apparent that the invention is not limited to these embodiments, but numerous modifications could be made thereto by those skilled in the art without departing from the basic concept and scope of the invention.

According to the present invention, both the voltage on the connection terminal and the current flowing through the secondary battery are used for detecting the operation conditions of the secondary battery and the connection conditions between the secondary battery and the charging device, it is possible to provide a battery connection detection circuit that is able to correctly determine the operation condition of the secondary battery and the connection condition between the secondary battery and the charging device even when high frequency noise is superposed on the power supply of the charging device, and even when the output voltage of the power supply decreases.

In addition, the operation conditions of the secondary battery and the connection conditions between the secondary battery and the charging device are detected when the load circuit does not consume a current, thus, it is possible to further improve reliability of the determination.

Further, because a bipolar transistor is used in the current control transistor in the current supplying circuit which supplies a current to the secondary battery, the high frequency noise superposed on the power supply voltage can hardly be transmitted to the connection terminal T1, hence, it is possible to further improve reliability of the determination.

This patent application is based on Japanese Priority Patent Application No. 2003-091307 filed on Mar. 28, 2003, the entire contents of which are hereby incorporated by reference.

The invention claimed is:

1. A battery connection detection circuit for detecting whether a secondary battery is operable and whether the secondary battery is reliably connected to a charging device, comprising:
    a current supplying circuit configured to supply a current to the secondary battery;
    a constant voltage circuit configured to control the current from the current supplying circuit so that a voltage on a connection terminal T1 for connecting the secondary battery is constant;
    a constant current circuit configured to control the current from the current supplying circuit so that the current supplied to the secondary battery is constant; and
    a determination circuit configured to concurrently determine operation states of both the constant voltage circuit and the constant current circuit, said determination circuit determining whether the secondary battery is operable and whether the secondary battery is reliably connected to the charging device according to the operation states of the constant voltage circuit and the constant current circuit,
    wherein when it is determined that the current flowing through the secondary battery is higher than a predetermined value from the operation state of the constant current circuit, the determination circuit determines that the secondary battery is operable and the secondary battery is reliably connected to the connection terminal T1.

2. The battery connection detection circuit as claimed in claim 1, wherein the determination circuit determines an operation state of a load circuit that receives power supply from the secondary battery; and
    when it is detected that the load circuit does not consume a current, the determination circuit determines whether the secondary battery is operable and whether the secondary battery is reliably connected to the charging device according to the operation states of the constant voltage circuit and the constant current circuit.

3. The battery connection detection circuit as claimed in claim 1, wherein when it is determined that the voltage on the connection terminal T1 is lower than a predetermined value from the operation state of the constant current circuit, the determination circuit determines that the secondary battery is operable and the secondary battery is reliably connected to the connection terminal T1.

4. The battery connection detection circuit as claimed in claim 1, wherein the current supplying circuit includes a current control transistor that controls the current supplied to the secondary battery according to a control signal input to a control electrode thereof;
    the constant voltage circuit includes
    a voltage detection circuit that detects the voltage on the connection terminal T1 and outputs a voltage Vd1 proportional to the detected voltage,
    a first calculation amplification circuit into which the output voltage Vd1 from the voltage detection circuit and a first reference voltage Vs1 are input, and
    a first control transistor whose operation is controlled according to an output signal CV from the first calculation amplification circuit;
    the constant current circuit includes
    a current detection circuit that converts the current supplied by the current supplying circuit into a voltage and outputs the voltage,
    a second calculation amplification circuit into which the output voltage from the current detection circuit and a second reference voltage Vs2 are input, and
    a second control transistor whose operation is controlled according to an output signal CC from the second calculation amplification circuit; and
    the current control transistor controls the current supplied to the secondary battery according to operations of the first control transistor and the second control transistor.

5. The battery connection detection circuit as claimed in claim 1, wherein the current supplying circuit includes a current control transistor that controls the current supplied to the secondary battery according to a control signal input to a control electrode thereof;
    the constant voltage circuit includes
    a voltage detection circuit that detects the voltage on the connection terminal T1 and outputs a voltage Vd1 proportional to the detected voltage,
    a switching circuit that exclusively selects one of a plurality of input reference voltages Vr1 to Vrn according to an input control signal Sc1, and outputs the selected reference voltage as a first reference voltage Vs1,
    a first calculation amplification circuit into which the output voltage Vd1 from the voltage detection circuit and the first reference voltage Vs1 are input, and a first control transistor whose operation is controlled according to an output signal CV from the first calculation amplification circuit;

the constant current circuit includes a current detection circuit that converts the current supplied by the current supplying circuit into a voltage and outputs the voltage, a second calculation amplification circuit into which the output voltage from the current detection circuit and a second predetermined reference voltage Vs2 are input, and a second control transistor whose operation is controlled according to an output signal CC from the second calculation amplification circuit; and the current control transistor controls the current supplied to the secondary battery according to operations of the first control transistor and the second control transistor.

6. The battery connection detection circuit as claimed in claim 4, wherein the operation state of the constant voltage circuit corresponds to a state of the output signal CV from the first calculation amplification circuit; and the operation state of the constant current circuit corresponds to a state of the output signal CC from the second calculation amplification circuit.

7. The battery connection detection circuit as claimed in claim 4, wherein the current control transistor includes a MOS transistor.

8. The battery connection detection circuit as claimed in claim 4, wherein the current control transistor includes a bipolar transistor.

9. The battery connection detection circuit as claimed in claim 4, wherein the determination circuit determines the secondary battery is operable and the secondary battery is reliably connected to the connection terminal T1, when the output signal CV from the first calculation amplification circuit indicates that the output voltage Vd1 from the voltage detection circuit is lower than the first reference voltage Vs1, or when the output signal CC from the second calculation amplification circuit indicates that the output voltage from the current detection circuit is higher than or equal to the second reference voltage Vs2.

10. The battery connection detection circuit as claimed in claim 1, wherein the current supplying circuit, the constant voltage circuit, the constant current circuit, and the determination circuit are integrated in one Integrated Circuit (IC).

11. The battery connection detection circuit as claimed in claim 2, wherein the current supplying circuit, the constant voltage circuit, the constant current circuit, the determination circuit, and the load circuit are integrated in one Integrated Circuit (IC).

12. The battery connection detection circuit as claimed in claim 4, wherein the determination circuit determines the secondary battery is operable and the secondary battery is reliably connected to the connection terminal T1, when the output signal CV from the first calculation amplification circuit is higher than a first predetermined value, or when the output signal CC from the second calculation amplification circuit is lower than a second predetermined value.

* * * * *